Figure 1:
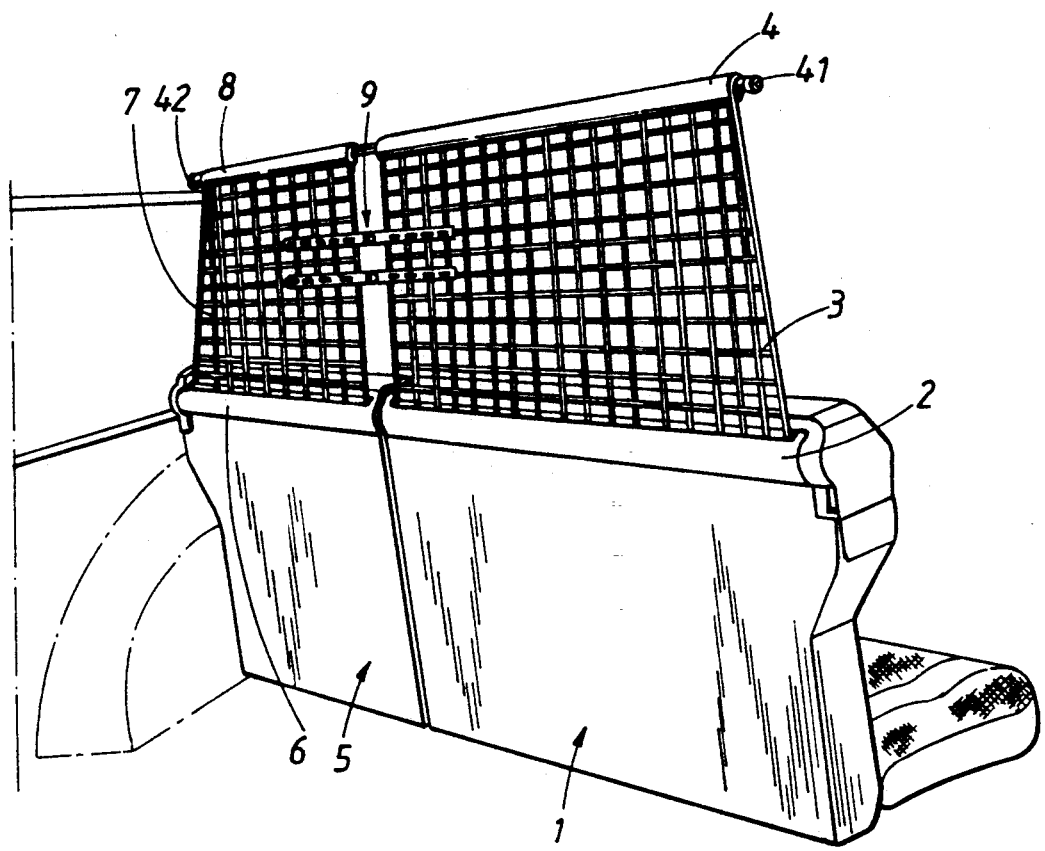

United States Patent [19]
Pilhall

[11] Patent Number: 5,288,122
[45] Date of Patent: Feb. 22, 1994

[54] LOAD RESTRAINING DEVICE
[75] Inventor: Stig Pilhall, Trollhattan, Sweden
[73] Assignee: AB Volvo, Sweden
[21] Appl. No.: 920,361
[22] Filed: Sep. 28, 1992
[30] Foreign Application Priority Data
Feb. 16, 1990 [SE] Sweden ............... 9000549-7
[51] Int. Cl.⁵ .............................................. B60R 5/04
[52] U.S. Cl. ................................. 296/24.1; 296/37.16;
160/25; 160/120; 160/290.1
[58] Field of Search ............................. 296/37.16, 24.1;
160/23.1, 25, 120, 290.1

[56] References Cited
U.S. PATENT DOCUMENTS

| | | | |
|---|---|---|---|
| 1,363,746 | 12/1920 | Nossek | 160/25 X |
| 1,638,346 | 8/1927 | Levy | 160/120 |
| 2,060,582 | 11/1936 | Leffert | 160/120 |
| 3,891,263 | 6/1975 | Orsulak | 296/24.1 |
| 5,011,208 | 4/1991 | Lewallen | 296/37.16 |

FOREIGN PATENT DOCUMENTS

| | | | |
|---|---|---|---|
| 0258823 | 8/1987 | European Pat. Off. | |
| 2759777 | 6/1986 | Fed. Rep. of Germany | |
| 3729642 | 3/1989 | Fed. Rep. of Germany | |
| 2664634 | 1/1992 | France | 160/120 |
| 0190040 | 10/1984 | Japan | 296/37.16 |

Primary Examiner—Dennis H. Pedder
Attorney, Agent, or Firm—Lerner, David, Littenberg, Krumholz & Mentlik

[57] ABSTRACT

The present invention relates to rollably retractable cargo-retaining nets (3,7) for vehicles with folding split backrests (1,5). Separate net containers (2,6) are provided in the respective backrests (1,5) and the nets are joined by a telescopic rod at an upper end, which increases the safety and flexibility in comparison with known systems.

13 Claims, 7 Drawing Sheets

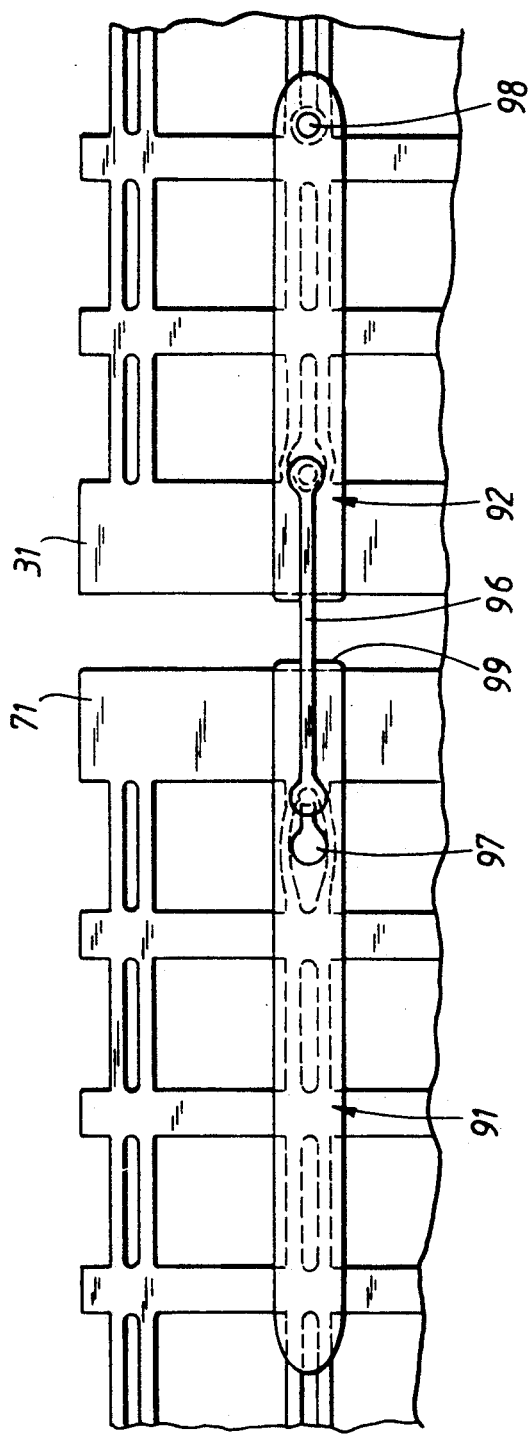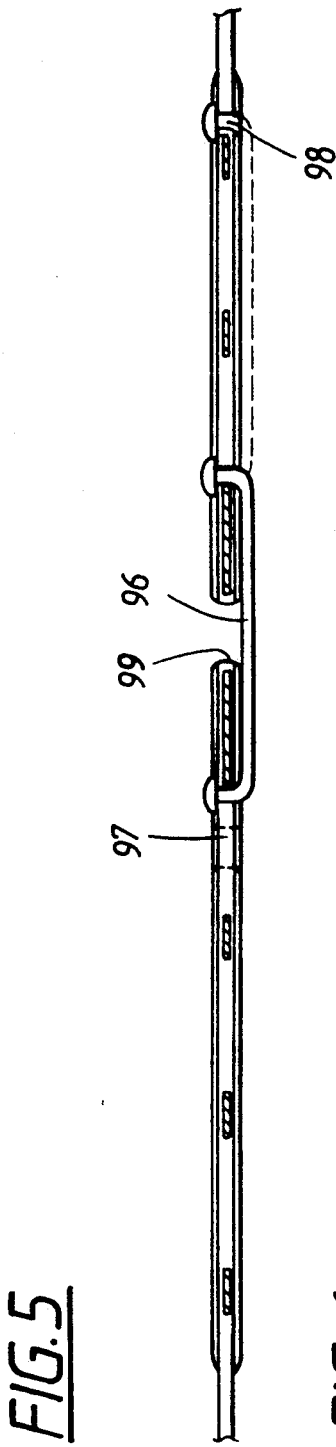

LOAD RESTRAINING DEVICE

TECHNICAL FIELD

The present invention relates to a rollably retractable cargo-retaining net, primarily for estate cars, the object of which being to protect passengers from loose articles flying around as a result of a heavy retardation.

BACKGROUND AND PROBLEMS

Nowadays it is generally known to make use of cargo-retaining nets in estate cars (station wagons). The cargo-retaining net screens off a rear space from a front space so that the cargo, during heavy braking for example, will not be thrown forwards into the passenger space. The most usual type of cargo net comprises a rigid frame within which a net is affixed. The frame is arranged with means so as to be able to be removably affixed between the rear backrest and the roof. This type of cargo-retaining net presents the disadvantage that when not in use it occupies unnecessary space. Neither is it aesthetically pleasing and, because of its dimensions, it is difficult to stow away in a convenient manner. Furthermore, they cannot be used in a forward cargo-retaining position.

Cargo-retaining nets are previously known from DE-C-2 759 777 and US-A-891 263 which, in principle, solve the above-mentioned problems in that they are made rollably retractable. These known solutions do, however, present several disadvantages. DE-C-2 759 777 firstly suffers from the disadvantage that the net unit is not integral with the rear seat backrest, which can give rise to injury and is seen to be aesthetically detrimental. Secondly, such a unit does not permit the desired flexibility; it is for example not possible with split rear seats to fold only the wide seat back if the unit is mounted thereto. US-A-3 891 263 shows a rollably retractable cargo-retaining net which can at least partially screen off a front space from a rear space of a motor vehicle, particularly of the estate car type, whereby the net in its retracted condition is arranged in a net container which is positioned in, and forms an integral unit with, the backrest, and the net is, at its withdrawable end, provided with first fastening means which are intended to cooperate with second fastening means attached to the vehicle for fixing of the net in its withdrawn condition.

This latter-mentioned cargo-retaining net is not intended to be used in vehicles with foldable rear seat backrests. This known cargo-retaining net is particularly not intended, or adapted, for application where the rear seat backrest is split. Such a division of the rear seat backrest offers many advantages and is therefore nowadays frequently installed in estate cars.

SOLUTION AND ADVANTAGES

The object of the present invention is to provide a rollably retractable cargo-retaining net which overcomes the above mentioned disadvantages and which is suitable for use in vehicles in which the rear seat backrest is split and at least one of the parts is foldable.

Said object is achieved by means of a rollably retractable cargo-retaining net according to the present invention which is characterized in that a first net unit is arranged on a first part of said backrest and that at least a further net unit is arranged on at least a further part of said backrest, whereby at least one of said backrest parts is foldably arranged between a substantially horizontal position and a substantially vertical position and that the two parts, at least in the substantially vertical position, extend substantially in the same plane.

Figure 2:
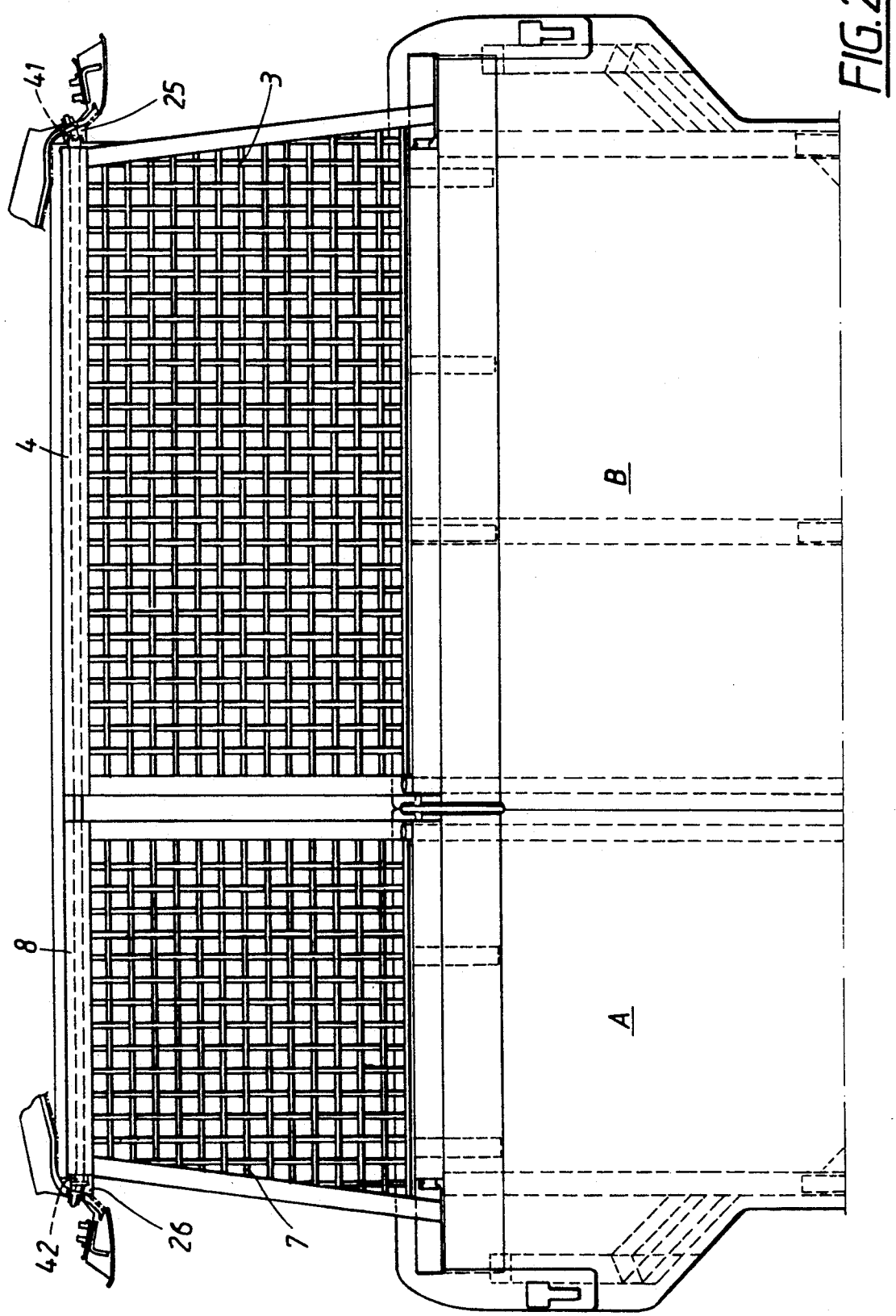
Figure 3:
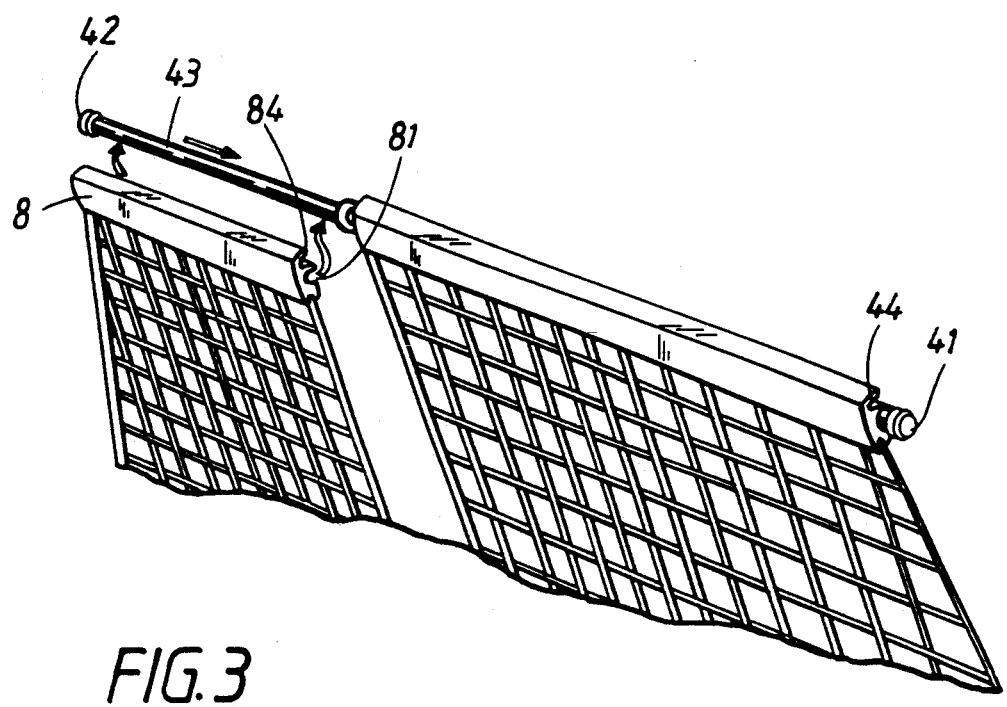
Figure 4:
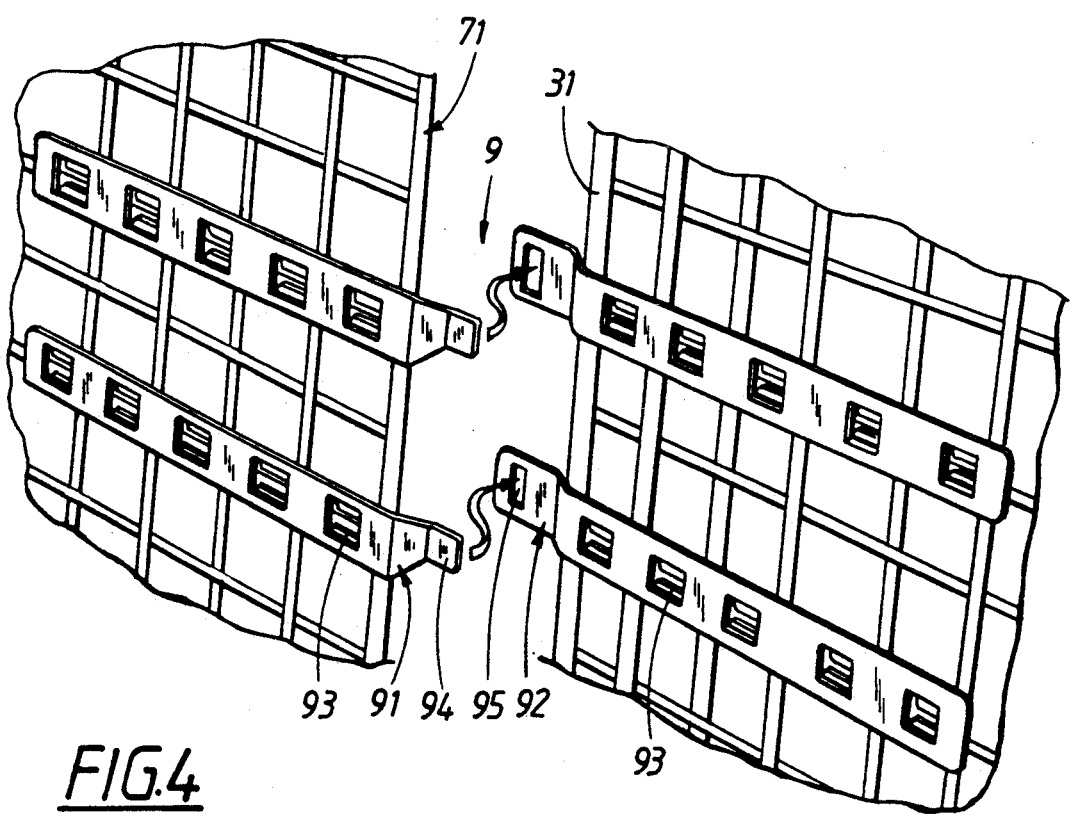
Figure 7:
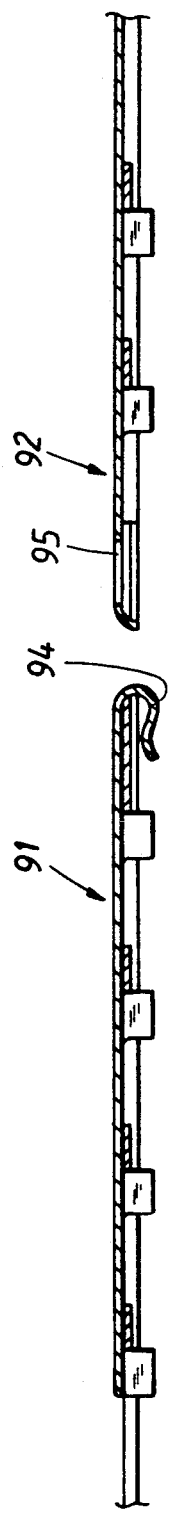
Figure 8:
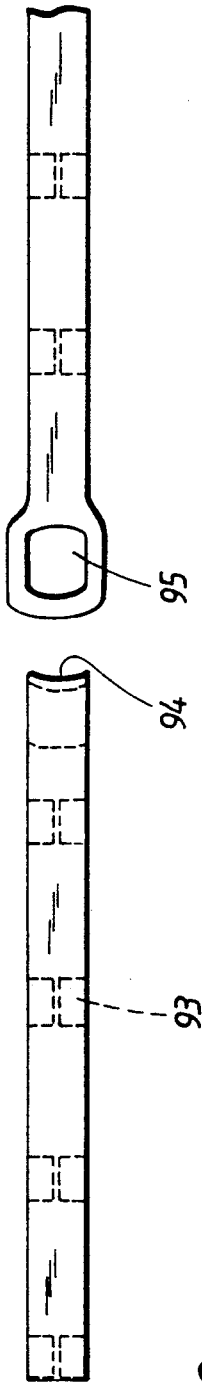
Figure 9:
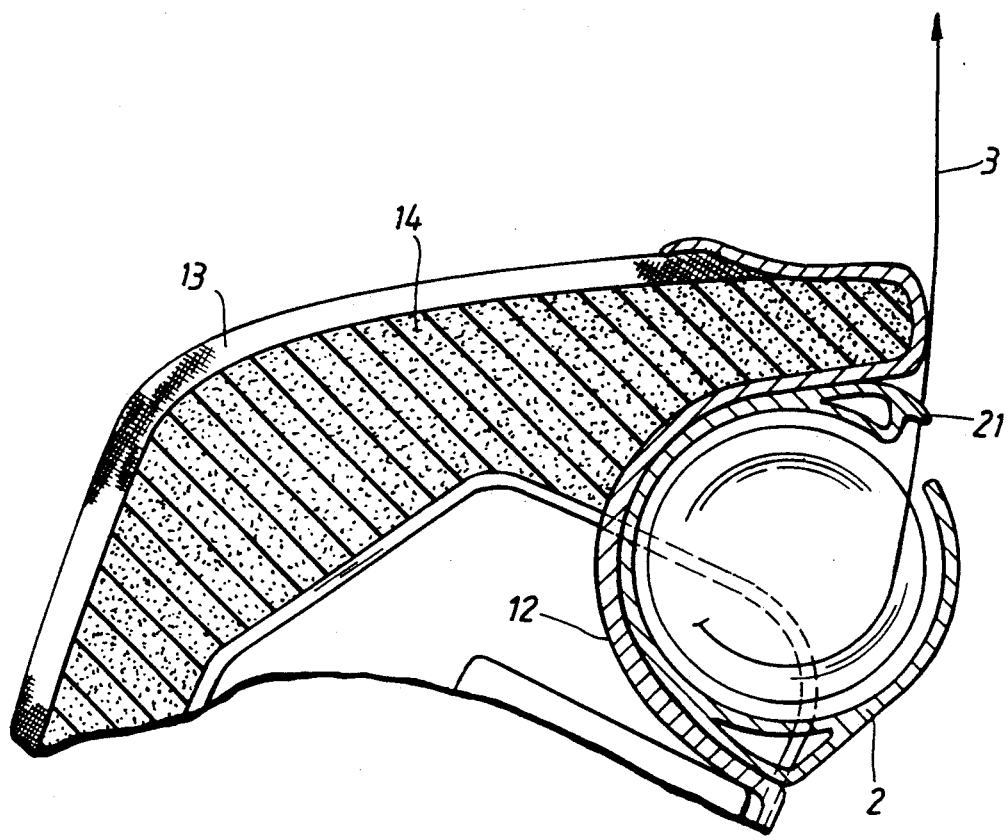
Figure 10:
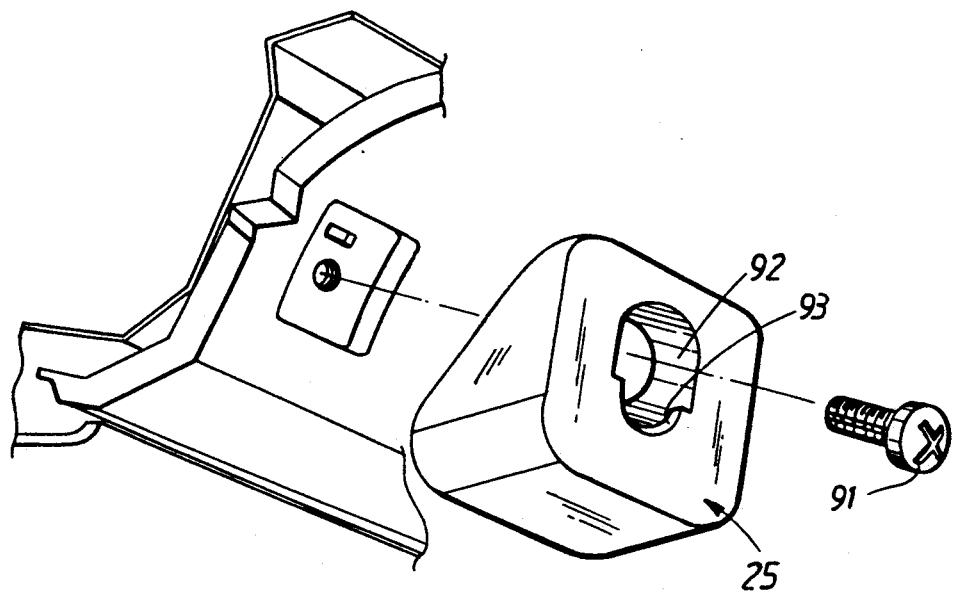
Figure 11:
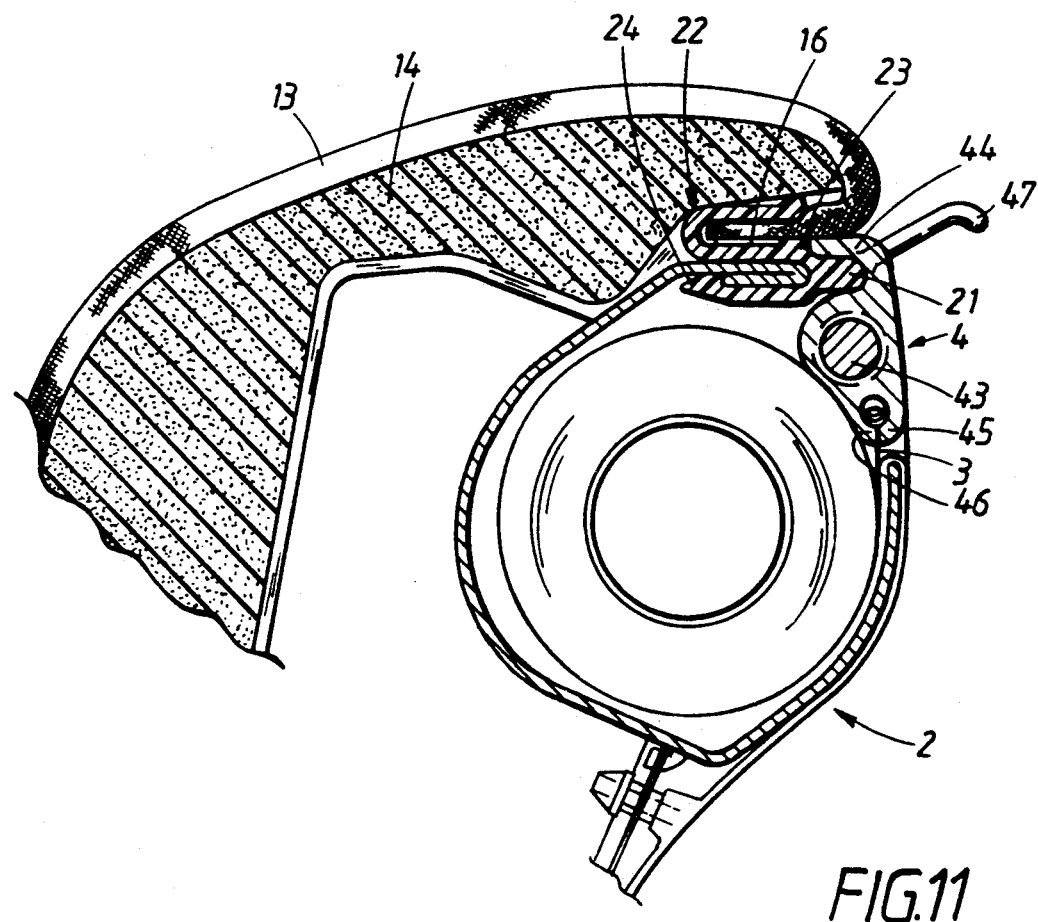

The invention shall be described in more detail in the following with help of a preferred embodiment, with reference to the attached drawings in which;

FIG. 1 shows a part of a vehicle seen in a perspective oblique rear view, wherein a cargo-retaining net in accordance with the invention is arranged on a split rear seat backrest, FIG. 2 shows a split rear seat backrest with a cargo-retaining net according to the invention, seen from the rear, FIG. 3 shows, in perspective, selected upper parts of a cargo-retaining net in accordance with the invention, FIG. 4 shows coupling elements for connecting together the adjacent extended cargo-retaining net edges, FIGS. 5 and 6 show a first alternative embodiment of the coupling elements, FIGS. 7 and 8 show a second alternative embodiment of such coupling elements, FIG. 9 shows a vertical section through a backrest which is provided with an arrangement according to the invention, FIG. 10 shows a preferred attachment means, and FIG. 11 shows a vertical section as in FIG. 9, though with the net in its retracted position.

Figure 12:
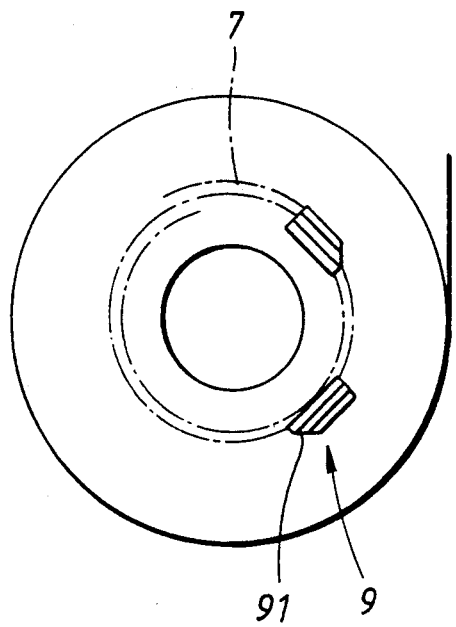

FIG. 12 shows a vertical section of a cargo-retaining net in its retracted position.

In FIG. 1 a rear seat backrest is shown which is split into two parts 1, 5 which can be independently raised and lowered. The division is made in such a way that approximately ⅓ of the backrest 5 can have its position changed independently of the position of the second part 1 which occupies approximately ⅔ of the total width.

In the upper end of each backrest part 1, 5 respectively, there is arranged integrally therewith a net container 2, 6 respectively. A rollably retractable net 3, 7 resp. is arranged in the net container. The free net ends each present a continuous profile piece 4, 8 respectively.

The profile piece 4, which is arranged on the wider backrest 1, is provided with fastening means 41, 42. These fastening means 41, 42 are intended to cooperate with attachment means 25, 26 arranged on the body (see FIG. 2) so that the net can be affixed in its extended position. One 42 of these fastening means is arranged on a telescopically extendable rod 43 (see FIG. 3). For affixing the other net 7 in its extended position, it is provided with a profile piece 8 on its free end which can be clipped onto said extendable rod 43. To prevent objects from being able to slip through between the inner net edges 31, 71 both the net parts 3, 4 are provided with coupleable elements 9.

In FIG. 2, in a rear view, it is shown that the fastening means 41, 42, which are arranged on the one profile piece 4 in the extended position, are hooked into cooperating attachment means 25, 26 which are affixed in rigid parts, suitably roof welds, in the vehicle's roof region. In the case where the wider backrest 1 is in its folded position, the net 3 can be withdrawn and fixed in its extended condition in a front attachment arrangement. This further attachment arrangement corresponds in shape and height level with those 25, 26 which are affixed on the door welds. These additional attachment arrangements are positioned further forward in the vehicle so that the net can even here extend substantially at right angles to the vehicle's longitudinal direction. These latter-mentioned forward attachment arrangements are suitably built into the car's rear grab handles. The attachments (both front and rear) are so formed that they can take up the maximum force which is thought likely to affect the cargo net during a frontal collision, i.e. a force directed forwards and downwards.

FIG. 10 shows in perspective how such an attachment means 25 is shaped in a preferred case. The fastener 25 is intended to be fixed to the roof weld by means of a screw 91. The fastener presents a keyhole-shaped recess 92 whose upper portion is large enough to give free access for the fastening means 42 with which it is intended to cooperate. The lower portion of the recess presents a flange 93 which secures said means 42 when it is pushed down thereinto.

From FIG. 3 it can be seen that the one profile piece 8 is formed with a continuous recess 81 which is formed in such a way that the smaller net 7 with its profile piece 8 can be fixedly clipped to the extended rod 43. Furthermore, it can be seen that each profile piece 4, 8 is formed with an easily grippable flange 44, 84, intended to surround and conceal load bearing locking elements 21.

FIG. 4 shows a first embodiment of connectable elements 9 which are intended to prevent objects from slipping through the slot between the two net parts 3, 7. In this first alternative embodiment, these elements 9 consist of elongate steel strips, each being fixedly clipped to a net mesh with the help of foldable tabs 93. On the one net edge 71, two male elements 91 are arranged which have a tongue 94 which is intended to be inserted into an opening 95 in a female element 92 which is arranged in a similar manner on the other nets edge 31. Further visible from this figure, as well as the previous ones, is that a stitched net has been used. A woven net can however also be suitable. The advantage with the stitched type is that it is similarly strong in both directions.

A second alternative embodiment of the connection element 9 is shown in FIG. 5 and 6. A plastic piece 91, 92 is affixed to each net edge. These pieces are suitably of the "snap-together" type with a division down the middle 95. They are accordingly attached to the net edge by being folded at the middle 95, round the net edge whereafter the two halves can be snapped together. The snap means can be one of a plurality of known types. A hole 97 having a slot is provided in the female element 91. This slot-equipped hole 97 is intended to cooperate with a hook 96, suitably made from metal, which is pivotably arranged in the male element 92. The male element 92 is also provided with a recess 98. This recess 98 in the male element is to secure the hook 96 in its inactive position to prevent it being thrown around (see the dashed position in FIG. 6).

A preferred embodiment of the coupling elements 9 is shown in FIGS. 7 and 8. Here, a hook 94 and eye 95 system is adopted. The female piece 92 is displaceable so that the connecting operation can be achieved. As in FIG. 5 and 6, foldable parts 93 are suitably employed for affixing the pieces 9.

Common for all the connection pieces 9 is that they are distributed along each net in such a way that in the rolled-up condition the do not lay one above the other. In this way the maximum diameter which is formed by the rolled-up net is reduced. (FIG. 12)

A net 3 with its container 2 is shown in FIG. 9 arranged on a backrest 1. The net container 2 is hereby arranged in an integral and aesthetic manner in the backrest 1. In order to obtain a durable fastening of the net container 2, it is arranged in a transversally extending member 12, provided in the backrest 1. The member 12 and other force bearing parts are connected by a stable frame construction, dimensioned so that the force which is incurred by a load of fair weight in a collision can be borne thereby. The outer surface of the seat 1 is covered by a fabric 14, which encloses a stuffing 13 in a known way.

FIG. 11 shows a preferred embodiment which in principle shows the same section as in the alternative embodiment according to FIG. 9. FIG. 11 shows the net 3 in its rolled-up state. The profile piece 4 is hereby substantially flush with other adjacent parts 13, 2 of the backrest. The telescopic part 43 is arranged within the profile piece. The profile piece's lower part presents two tongues 45, 46 which have been bent into contact with each other so that the net's upper part is securely fastened. This solution means that it is easier to fulfil existing rear view requirements (for example FMVSS 111) when the net is withdrawn and fastened up, since such a fastening does not form anything, as opposed to the use of an intermediate part to which the net is fixedly sewn. Furthermore, this preferred fastening manner gives a more effective fixation and a more aesthetic embodiment.

FIG. 11 further shows that the profile piece 4 is equipped with gripable withdrawal straps 47 and how the upper flange 44 clasps and conceals the locking member 21. This locking member 21, which is made up of a plurality of projecting elements distributed along the entire length of the container, is integral with an S-shaped strip 22. The strip 22 is affixed to the container by being clipped to a projecting edge and maintained with the help of a stop member 24. The upper part of the strip 22 is used to attach the fabric 13 which encloses the stuffing 14 of the seat. For this purpose, the strip is formed with a further stop member 23, which cooperates with a plastic part 16 which is fixedly sewn to the fabric 13.

The invention is not restricted to that shown above, but can be varied within the scope of the appended claims. Accordingly it is, for example, possible, that instead of a telescopically extendable rod 43, to provide the vehicle with a wire at each desired fastening location to which the two net parts can be hooked. This gives the advantages that the small net section 7 can also be erected individually. A further alternative embodiment is to fit a bracket in line with the division of the backrest. The roof construction of most vehicles is not, however, suited for attachment of such a bracket at a corresponding point.

In addition, the invention is not restricted to a rear seat which is split in two parts at a third of its width. Other split widths, such as a central division, are also possible, as is providing the rear seat with more than one division. A further alternative is to have the net erectable only when the seat is in its raised position. Such a solution implies that the lock member 21 becomes superfluous, since the length of the net can then provide the locking factor.

In the figures it is shown that two coupling elements are used. It is, however, clear to the skilled man that this number can be varied within wide limits in accordance with what is seen to be most suitable. It ought to be pointed out that several coupling elements 9 are of course required when both of the net parts are extended in the forward position, i.e. when the backrests 1, 5 are in the folded down position. Furthermore, the taps 93 for fastening the coupling elements 9 can also be arranged to engage two rather than one mesh. The net containers 2 are suitably provided with spring means for automatic retraction of the net.

If the car is equipped with fasteners 25, 26 in accordance with the above described, these can also be used to fix a conventional non-divided net. A preferred solution is thus to make use of a rod which extends the whole way across the roof, and which at least at its one end has a telescopic member, suitably influenced by an outwardly-directed elastic force so that it can be easily hooked up by being snapped in. The rod is removed by pulling a device which influences said member with an inwardly-directed compressive force and simultaneously lifting the rod from the fasteners 25, 26.

The skilled man will recognize that some of the components which make up the invention are not restricted to use in vehicles with divided, foldable back seats. Accordingly, by way of example, the strip 22 can also advantageously be used on non-divided rear seats. The described fasteners 25, 26 can also be used in connection with this latter mentioned embodiment. Furthermore, the invention is not restricted to the described fasteners 25, 26, and other variations are imaginable. For example, one such variation would be to insert the fastening means 41, 42 into a rearwardly open slot, which is provided with suitable stop means.

I claim:

1. A net assembly for partially screening off a front space from a rear space in a motor vehicle, said motor vehicle including a first backrest part and a second backrest part such that at least one of said backrest parts is foldably arranged between a substantially horizontal position and a substantially vertical position, and such that when said first and second backrest parts are in said substantially vertical positions said backrest parts substantially extend in the same plane, said net assembly comprising
    a first rollably retractable cargo-retaining net associated with said first backrest part and having a withdrawable end,
    a second rollably retractable cargo-retaining net associated with said second backrest part and having a withdrawable end,
    a net container provided on and forming an integral unit with each of said backrest parts, said net container for containing said nets when said nets are in a rolled up condition,
    a telescopically extendable rod provided at said withdrawable end of said first net and including a free end,
    first fastening means connected to said free end of said telescopically extendable rod for fastening said net in an extended condition,
    second fastening means affixed to the vehicle and for cooperating with said first fastening means,
    means associated with said withdrawable end of said second net for connecting to said telescopically extendable rod.

2. The net assembly of claim 1 wherein each said net container further comprises locking elements and said net assembly further comprises continuous profile pieces on said withdrawable ends, said profile pieces including an outer continuous part for clasping and concealing said locking elements.

3. The net assembly of claim 2 wherein said locking element is an S-shaped strip having a first stop member for holding said backrest and a second stop member for fastening said strip to said net container.

4. The net assembly of claim 1 further comprising profile pieces on said withdrawable ends, wherein said profile pieces are attached to said nets by two tongues.

5. The net assembly of claim 1 further comprising couplable elements connecting a side of said first net to a side of said second net for partially closing any gap which is formed between said first and second net when said nets are in the extended condition.

6. The net assembly of claim 5 wherein said nets in the rolled up condition define a longitudinal axis and radial directions orthogonal to and away from said longitudinal axis, and for every one radial direction, only one said couplable element is intersected by such radial direction.

7. The net assembly of claim 6 wherein said second fastening means includes a housing defining a recess and a flange disposed along the lower portion of said recess.

8. A net assembly for partially screening off a front space from a rear space in a motor vehicle, said motor vehicle including a first backrest part and a second backrest part, said net assembly comprising
    a first net having a backrest end connected to said first backrest part and having a withdrawable end remote to said backrest end,
    a second net having a backrest end connected to said second backrest part and having a withdrawable end remote to said backrest end,
    a telescopically extendable rod having two ends and provided at said withdrawable end of said first net,
    fastening means for connecting said ends of said telescopically extendable rod to said vehicle, and
    attachment means on said withdrawable end of said second net for connecting said second net to said telescopically extendable rod.

9. The net assembly of claim 8 wherein said net assembly further comprises a net container capable of holding said second net in a rolled-up condition and connecting said backrest end of said second net to said second backrest part.

10. The net assembly of claim 9 wherein said net assembly further comprises a net container capable of holding said first net in a rolled-up condition and connecting said bakcrest end of said first net to said first backrest part.

11. The net assembly of claim 10 wherein said first and second backrest parts are foldably arranged between a substantially horizontal position and a substantially vertical position, and such that when said first and second backrest parts are in said substantially vertical positions said backrest parts substantially extend in the same plane.

12. The net assembly of claim 11 wherein said attachment means includes a gripping member for removable attaching said second net to said telescopically extendable rod and a clasping means for clasping said attachment means to said net container.

13. The net assembly of claim 8 further comprising net coupling means for joining said first net to said second net and for diminishing any gap between said first net and said second net.

* * * * *

UNITED STATES PATENT AND TRADEMARK OFFICE
CERTIFICATE OF CORRECTION

PATENT NO. : 5,288,122

DATED : February 22, 1994

INVENTOR(S) : Pilhall

It is certified that error appears in the above-identified patent and that said Letters Patent is hereby corrected as shown below:

On the cover page
[30] Foreign Application Priority Data
after "February 16, 1990 [SE] Sweden.......9000549-7"
 insert --PCT/SE91/00093 2-12-91--

Column 5, line 6, "bakcrest" should read --backrest--.

Signed and Sealed this

Second Day of August, 1994

Attest:

BRUCE LEHMAN

Attesting Officer    Commissioner of Patents and Trademarks